(12) United States Patent
Richardson

(10) Patent No.: US 11,649,897 B1
(45) Date of Patent: May 16, 2023

(54) VALVE PLUG APPARATUS FOR USE WITH CONTROL VALVES

(71) Applicant: Fisher Controls International LLC, Marshalltown, IA (US)

(72) Inventor: Jonathan W Richardson, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 17/579,430

(22) Filed: Jan. 19, 2022

(51) Int. Cl.
| | |
|---|---|
| *F16K 1/36* | (2006.01) |
| *F16K 39/02* | (2006.01) |
| *F16K 1/04* | (2006.01) |
| *F16K 1/48* | (2006.01) |

(52) U.S. Cl.
CPC ............. *F16K 1/36* (2013.01); *F16K 1/04* (2013.01); *F16K 39/02* (2013.01); *F16K 1/482* (2013.01); *F16K 1/487* (2013.01)

(58) Field of Classification Search
CPC . F16K 1/04; F16K 1/487; F16K 1/482; F16K 1/36; F16K 39/02
See application file for complete search history.

(56) References Cited

U.S. PATENT DOCUMENTS

| | | | |
|---|---|---|---|
| 3,712,587 A * | 1/1973 | Specht | F16K 31/52408 251/285 |
| 9,995,400 B2 | 6/2018 | Richardson et al. | |
| 2012/0235069 A1* | 9/2012 | Richardson | F16K 1/487 251/366 |
| 2014/0014865 A1* | 1/2014 | Anderson | F16K 3/246 251/213 |
| 2015/0040998 A1* | 2/2015 | Gilstad | F04B 53/1087 137/514 |
| 2018/0149279 A1* | 5/2018 | Mann, III | F16K 1/36 |
| 2019/0024804 A1* | 1/2019 | Jackson | F16K 3/243 |
| 2019/0024805 A1* | 1/2019 | Jackson | F16J 15/32 |

* cited by examiner

*Primary Examiner* — Craig M Schneider
*Assistant Examiner* — Christopher D Ballman
(74) *Attorney, Agent, or Firm* — Hanley, Flight & Zimmerman, LLC

(57) ABSTRACT

Methods, apparatus, systems, and articles of manufacture are disclosed for a valve plug apparatus for use with control valves. An example valve plug apparatus disclosed herein an upper plug segment, a middle plug segment, and a lower plug segment, the middle plug segment positioned between the upper plug segment and the lower plug segment, the upper plug segment, the middle plug segment and the lower plug segment defining an overall length of the valve plug, the middle plug segment removably coupled to the upper plug segment and the lower plug segment.

20 Claims, 7 Drawing Sheets

VALVE PLUG APPARATUS FOR USE WITH CONTROL VALVES

FIELD OF THE DISCLOSURE

This disclosure relates generally to fluid valves and, more particularly, to valve plug apparatus for use with control valves.

BACKGROUND

Control valves are often used in process control plants or systems to control the flow of process fluid. To control the flow of fluid, fluid control valves employ a valve plug moveable relative to a valve seat. Some control valves (e.g., globe valves) commonly include a valve cage with openings through which the fluid can flow when the valve plug is in an open position relative to the valve seat.

SUMMARY

An example valve plug apparatus disclosed herein includes an upper plug segment, a middle plug segment, and a lower plug segment. The middle plug segment is positioned between the upper plug segment and the lower plug segment. The upper plug segment, the middle plug segment and the lower plug segment define an overall length of the valve plug. The middle plug segment is removably coupled to the upper plug segment and the lower plug segment.

An example valve disclosed herein includes a valve body having a fluid inlet, a fluid outlet, and a fluid passageway extending between the fluid inlet and the fluid outlet. A valve plug apparatus is disposed in the fluid passageway. The valve plug apparatus is movable relative to the valve body to enable fluid communication between the fluid inlet and the fluid outlet. The valve plug apparatus includes a first plug segment, a second plug segment and a third plug segment. The second plug segment is positioned between the first plug segment and the third plug segment. The first plug segment, the second plug segment, and the third plug segment define an overall length of the valve plug. The second plug segment is removably coupled to the first plug segment and the third plug segment.

An example apparatus disclosed herein includes first means for forming a valve plug, second means for forming a valve plug removably coupled to the first means, and third means for forming a valve plug. The third means is removably coupled to the first means and the second means. The first means, the second means, and the third means are stackable to define an overall length of the valve plug.

Figure 1:
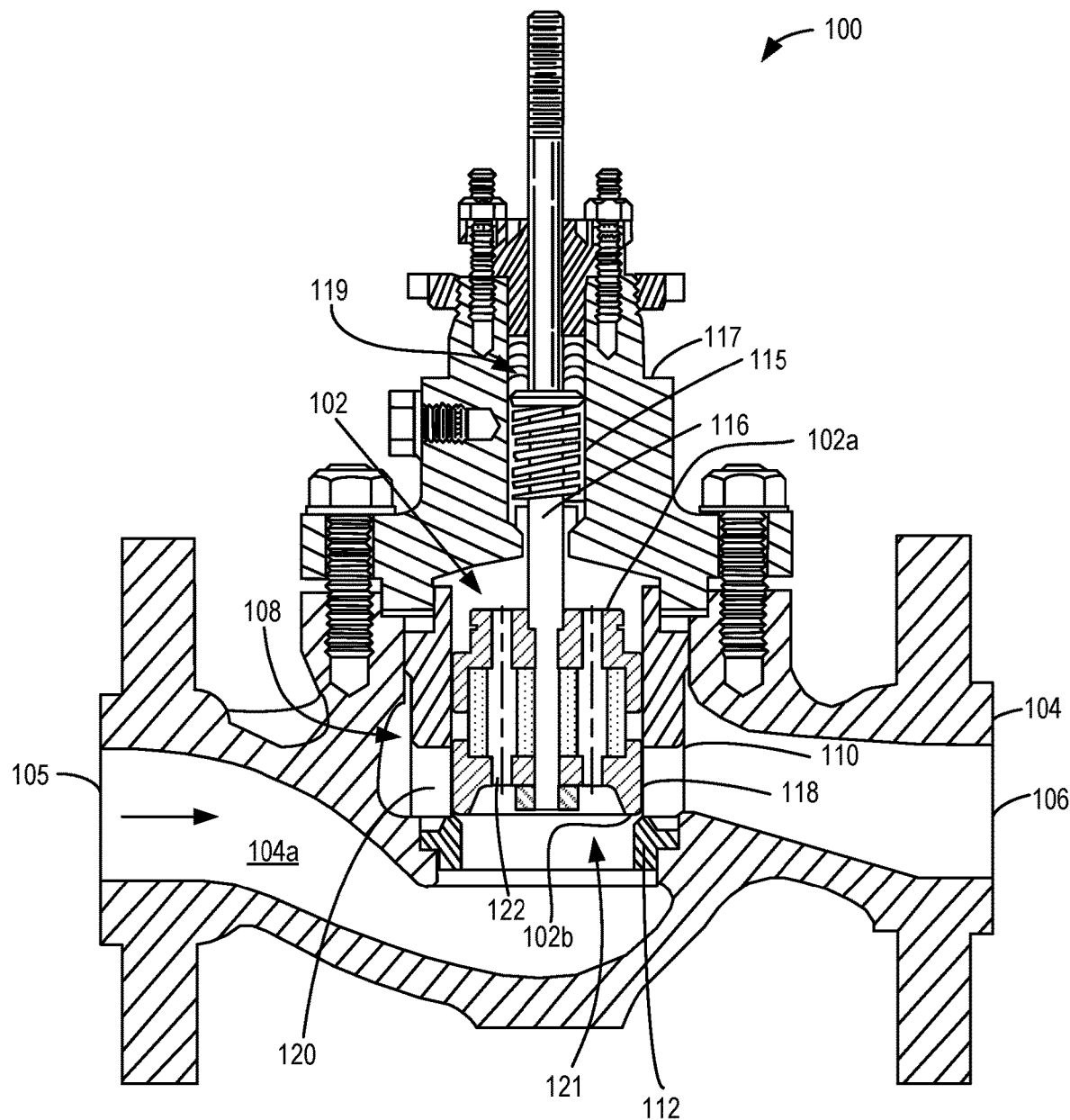
FIG. 1 is a cross-sectional view of a control valve including an example valve plug in accordance with teachings of this disclosure.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections.

DETAILED DESCRIPTION

Process control systems employ fluid control valves to control the flow of fluid between a first location and a second location. When a control valve is in a closed position, the control valve prevents fluid in a first (e.g., a high) pressure region at a valve inlet from flowing to a second (e.g., a lower) pressure region at a valve outlet. Alternatively, when the control valve is in an open position, the control valve allows fluid to flow from the first pressure region to the second pressure region. Opening and closing of the valve can be performed manually or via a command signal from a process control system communicatively coupled to the control valve.

To reduce pressure of fluid flowing through the control valve (e.g., to control cavitation and/or noise), some control valves employ a cage. Typically, the cage is a cylindrical body that includes openings in a sidewall of the cage through which the fluid flows when entering and/or exiting the valve. In sliding stem valves, a flow control member or valve plug is implemented or disposed within the cage to control fluid flow through the openings of the cage as the fluid flows between the inlet and the outlet of the control valve. The valve plug can move within a cavity or opening (e.g., an axial opening of the cage) in a rectilinear direction (e.g., upward and downward with respect to the cage along a central axis of the cage). In particular, the valve plug can move between a fully closed position and a fully open position. In a fully closed position, a sidewall (e.g., an outermost surface) of the valve plug blocks the openings of the cage to restrict or prevent fluid flow through the cage and, thus, between the inlet and the outlet of the control valve. In the fully open position, the sidewall of the valve plug uncovers the openings of the cage to allow fluid flow through the cage and, thus, between the inlet and the outlet of the control valve. In some cases, placement of the valve plug in a partially open position can vary (e.g., reduce) a flow rate of the fluid compared to the flow rate of the fluid when the valve plug is in the fully open position. In some examples, a cage is not employed and the valve plug moves relative to a valve seat to control or adjust (e.g., allow or prevent) fluid flow through the control valve.

Many valves (e.g., sliding stem valves, rotary valves, etc.) have different sizes and/or configurations. As such, manufacturers typically manufacture and/or stock valve components (e.g., cages, plugs, etc.) having different sizes and/or configurations to allow for assembly of different valves and/or reduce manufacturing turnaround times. However, each different valve component may necessitate dedicated manufacturing tooling (e.g., die cast tooling, a sheet metal stamping die, etc.), resulting in increased manufacturing and/or inventory costs.

Valve plugs for sliding stem control valves typically include a valve stem and a plug body. The valve stem includes an elongated cylindrical body to couple the plug body to an actuator (e.g., a pneumatic actuator, an electric actuator, a handwheel, etc.). In some examples, the plug body is a unitary cylindrical body with a smooth outer surface that couples to the valve stem via, for example, a threaded connection, a pin, welding, etc. In some examples, a plug body has a stepped outer surface with a varying outer diameter to engage with a valve seat and/or reduce a mass of the plug body. In some examples, the valve plug has a single or constant diameter (e.g., along a longitudinal length of the valve body). However, valves have different sizes and, thus, various valve plugs having different lengths in the longitudinal direction (e.g., vertical direction) are typically required. In other words, because of a fixed or unitary design of each valve plug (e.g., in a longitudinal direction), each valve plug configuration requires a unique design and manufacturing process.

Example valve plug apparatus disclosed herein provide modular valve plugs that can be used with different valves to reduce manufacturing complexity and/or costs. To increase a number of valve plug sizes and/or configurations while reducing manufacturing complexity and/or costs, example valve plug apparatus disclosed herein include a modular design. For example, valve plug apparatus disclosed herein include a plurality of plug segments that can be added or removed to adjust an overall length and/or diameter of the modular valve plug. For example, one or more valve plug segments can be added or stacked to increase an overall longitudinal length (e.g., a stack-up height, a vertical length, etc.) of a valve plug. In some examples, one or more valve plug segments can be removed from a valve plug to reduce an overall longitudinal length (e.g., a stack-up height, a vertical length, etc.) of the valve plug. In some examples, an example valve plug disclosed herein includes a first or upper plug segment, a second or middle plug segment, and a third or lower plug segment disposed around a valve stem, where the middle plug segment is positioned between the upper and lower plug segments. Example valve plug apparatus disclosed herein include a retainer to retain the upper plug segment, the middle plug segment, and the lower plug segment coupled to the valve stem. In some examples, the middle plug segment is interchangeable with another middle plug segment or segments to increase or decrease a dimensional characteristic (e.g., a length) of the valve plug.

Additionally or alternatively, example modular valve plug apparatus disclosed herein can be used to vary (e.g., increase or decrease) a diameter of the modular valve plug. In some examples, the upper plug segment and/or the lower plug segment are interchangeable with different example upper plug segments and/or lower plug segments, respectively, to increase or decrease a dimensional characteristic (e.g., a diameter) of the valve plug. In some examples, the upper plug segment, the middle plug segment, and/or the lower plug segment include openings to pressure-balance a valve plug. Thus, example valve plug apparatus disclosed herein can provide pressure-balanced valve plugs or valve plugs that are not pressure balanced. In some examples, modular valve plug apparatus disclosed herein can be used to vary (e.g., increase or decrease) a dimensional characteristic (e.g., an overall length or height in the direction of the longitudinal axis and/or a diameter) of the valve plug and/or a functional characteristic (e.g., pressure balance, a non-pressure balance of the valve plug).

FIG. 1 is a cross-sectional view of a control valve 100 having an example valve plug 102 in accordance with teachings of this disclosure. The control valve 100 of FIG. 1 includes a valve body 104 defining a fluid passageway 104a between a fluid inlet 105 and a fluid outlet 106. The control valve 100 includes a trim assembly 108 positioned (e.g., interposed) in the fluid passageway 104a of the valve body 104 between the fluid inlet 105 and the fluid outlet 106. The trim assembly 108 includes a cage 110, a valve seat 112, and the valve plug 102 (e.g., a fluid control member). The valve plug 102 is slidably disposed in a cavity of the cage 110 and movable relative to the valve seat 112 (e.g., and the cage 110) to control fluid flow through the fluid passageway 104a. To move the valve plug 102 relative to the cage 110, the valve plug 102 is coupled to an actuator (not shown) via a valve stem 116. The valve stem 116 passes through a stem opening 115 of a bonnet 117 coupled to the valve body 104. The bonnet 117 couples the valve body 104 to the actuator. A packing assembly 119 (e.g., a seal) prevents or reduces fluid leakage through the stem opening 115 to the environment.

In operation, the actuator (e.g., either from a control signal or a manual force) moves the valve plug 102 in a first direction (e.g., an upward direction in the orientation of FIG. 1) away from the valve seat 112 to an open position to allow fluid flow between the fluid inlet 105 and the fluid outlet 106 via the fluid passageway 104a. Conversely, the actuator moves the valve plug 102 in a second direction (e.g., in a downward direction in the orientation of FIG. 1) toward the valve seat 112 to a closed position (e.g., as shown in FIG. 1) to prevent or restrict fluid from flowing between the fluid inlet 105 and the fluid outlet 106. In some examples, the flow direction can be reversed (e.g., fluid flows through the valve body 104 from the fluid outlet 106 to the fluid inlet 105). In some examples, the valve plug 102 can be positioned in a partially open position or in a partially closed position relative to the valve seat 112 (e.g., between a fully open position and a fully closed position) to control the flow rate through the control valve 100.

The valve plug 102 of the illustrated example moves within the cage 110 between the closed position such that a sidewall 118 of the valve plug 102 covers one or more openings 120 of the cage 110 to prevent fluid flow through an orifice 121 (e.g., defined by the valve seat 112) of the fluid passageway 104a and the open position such that the sidewall 118 uncovers the opening(s) 120 of the cage 110 to allow fluid flow through the orifice 121 of the fluid passageway 104a.

To pressure-balance the valve plug 102, the example valve plug 102 of FIG. 1 includes balancing passages 122 (e.g., holes, channels, etc.). As a result, the example valve plug 102 is pressure-balanced during operation such that a pressure across a first or upper surface 102a of the valve plug 102 and a second or lower surface 102b of the valve plug 102 is substantially equal (balanced) such that a smaller force from the actuator is needed to move the valve plug 102 between the open and closed positions. In other words, because the example valve plug 102 is pressure-balanced, a force required by the actuator to control the movement of the valve plug 102 is reduced. In some examples, the valve plug 102 can be a non-pressure balanced valve plug. In other words, the valve plug 102 can be formed without the balancing passages 122.

The valve body 104 and/or valve trim assembly 108 of FIG. 1 is sized for specific fluid flow parameters and/or characteristics (e.g., flow capacity of the control valve, specific fluid flow coefficient (Cv), etc.). To vary (e.g., increase or decrease) flow characteristics of a fluid valve, a different valve body and/or a different valve trim is needed to provide a different flow capacity or flow parameters. For example, different valve body and/or valve trim configurations may be implemented to accommodate different operating conditions (e.g., of a process control plant).

For example, a larger sized valve body may be employed to accommodate a larger flow capacity. In such examples, a larger sized valve plug may be needed. A size (e.g., diameter and/or length) of the valve plug 102 may be increased or decreased in proportion to a size of a valve body (e.g., the valve body 104 of FIG. 1). In some examples, an inner diameter of the cage 110 may be increased or decreased based on desired flow rate conditions. As such, an outer diameter of the valve plug 102 is increased or decreased to reduce a gap between the inner diameter of the cage 110 and the outer diameter of the valve plug 102 (e.g., to prevent or reduce fluid leakage through the bonnet 117 and/or to maintain the valve plug 102 parallel or straight (e.g., vertically straight) relative to the cage 110). In some examples, a length of the cage 110 may be increased or decreased. As such, a length of the valve plug 102 is increased or decreased proportionate to the length of the cage 110. In other examples, the balancing load on the valve plug 102 may be increased or decreased by varying a surface area of the first surface 102a of the valve plug relative to a surface area of the second surface 102b of the valve plug 102, or an unbalanced valve plug may be desired (e.g., a valve plug without the balancing passages 122). In these examples, an alternative plug may be used in place of the valve plug 102. However, the example valve plug 102 disclosed herein is a modular valve plug 102. As used herein, modular valve plug means that a dimensional and/or functional characteristic (e.g., an overall length, a diameter, a pressure-balance scheme, etc.) of the valve plug can be adjusted (e.g., increased, decreased, changed, etc.) to vary one or more dimensional and/or functional characteristics.

Figure 2:
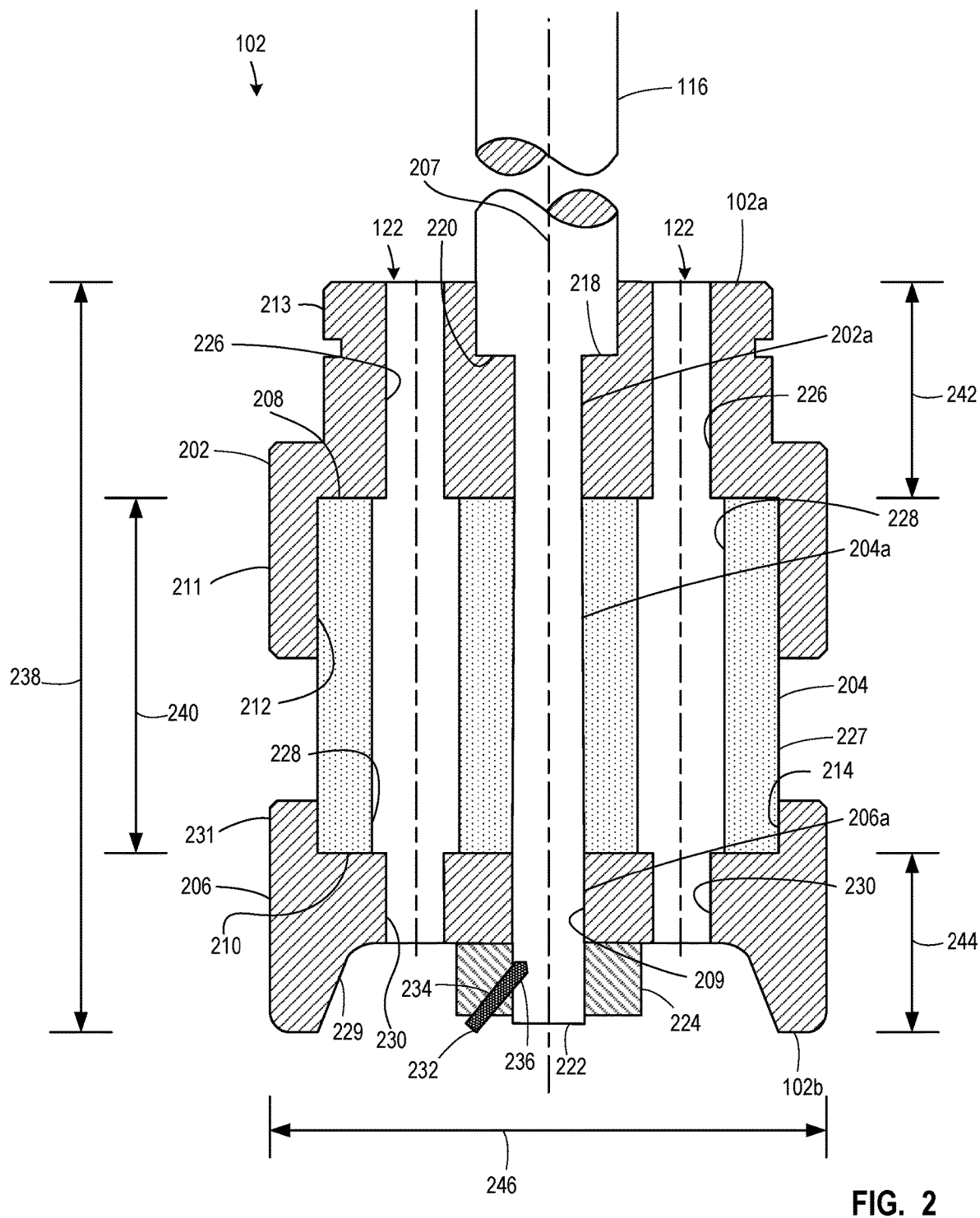
FIG. 2 is a cross-sectional view of the example valve plug of FIG. 1.

FIG. 2 is a cross-sectional view of the example valve plug 102 of FIG. 1. The example valve plug 102 of FIG. 2 includes a modular design. For example, the valve plug 102 of FIG. 1 includes a plurality of plug segments 202, 204, 206. The plug segments 202, 204, 206 can be interchanged with other plug segments to vary or change a dimensional and/or functional characteristic(s) of the valve plug 102.

The plug segments 202, 204, 206 and/or the valve plug 102 of the illustrated example of FIG. 2 includes a first or upper plug segment 202, a second or middle plug segment 204, and a third or lower plug segment 206. In the example of FIG. 2, the example valve plug 102 has a cylindrical shape (e.g., a circular cross-section in a plane perpendicular to a longitudinal axis 207 of the valve plug 102). In other examples, the valve plug 102 can have another shape such that the cross-section in the plane perpendicular to the longitudinal axis 207 of the valve plug 102 is a square, a hexagon, or any other shape.

The example upper plug segment 202 includes an upper plug cavity 212. Specifically, the upper plug segment 202 of the illustrated example includes a body 213 (e.g., a cylindrical body) and an annular wall or flange 211 projecting from the body 213 to define the upper plug cavity 212. The body 213 of the illustrated example includes an aperture 202a (e.g., through hole) coaxially aligned with the longitudinal axis 207 of the valve plug 102. The aperture 202a of the illustrated example is a stepped opening (e.g., a through hole and a counter bore coaxially aligned with the through hole). The aperture 202a of the illustrated example extends through the body 213 and is in communication with the cavity 212. Additionally, the upper plug segment 202 of the illustrated example includes upper balancing openings 226. The upper balancing openings 226 of the illustrated example are formed in the body 213 and are radially spaced relative to the longitudinal axis 207 of the valve plug 102. In the illustrated example, the upper plug segment 202 includes two balancing openings 226. However, in some examples, the upper plug segment 202 includes one balancing opening or more than two balancing openings (e.g., three, four, etc.).

The middle plug segment 204 of the illustrated example is a body 227 (e.g., a cylindrical body) having a first end 208 and a second end 210 opposite the first end 208. The body 227 of the illustrated example includes an aperture 204a (e.g., through hole) coaxially aligned with the longitudinal axis 207 of the valve plug 102. The aperture 204a of the illustrated example is a straight opening between the first end 208 and the second end 210. The body 227 includes a plurality of middle balancing openings 228 radially spaced relative to the longitudinal axis 207 of the valve plug 102. In the illustrated example, the middle plug segment 204 includes two balancing openings 228. However, in some examples, the middle plug segment 204 includes one balancing opening or more than two balancing openings (e.g., three, four, etc.).

The example lower plug segment 206 includes a lower plug cavity 214. Specifically, the lower plug segment 206 of the illustrated example includes a body 229 (e.g., a cylindrical body) and an annular wall or flange 231 projecting from the body 229 to define the lower plug cavity 214. The body 229 of the illustrated example includes an aperture 206a (e.g., through hole) coaxially aligned with the longitudinal axis 207 of the valve plug 102. The aperture 206a of the illustrated example extends through the body 229 and is in communication with the lower plug cavity 214. Additionally, the lower plug segment 206 of the illustrated example includes lower balancing openings 230. The lower balancing openings 230 of the illustrated example are formed in the body 229 and are radially spaced relative to the longitudinal axis 207 of the valve plug 102. In the illustrated example, the lower plug segment 206 includes two balancing openings. However, in some examples, the lower segment includes one balancing opening or more than two balancing openings (e.g., three, four, etc.).

When the upper, middle and lower plug segments 202, 204, 206 are assembled, the middle plug segment 204 is positioned between the upper plug segment 202 and the lower plug segment 206. Specifically, at least a portion (e.g., the first end 208) of the middle plug segment 204 is disposed within the upper plug cavity 212 and at least a portion (e.g., the second end 210) of the middle plug segment 204 is disposed within the lower plug cavity 214. Thus, the first annular wall 211 of the upper plug segment 202 extends along (e.g., surrounds or encircles) at least a portion of an outer surface of the middle plug segment 204 and the annular wall 231 of the lower plug segment 206 extends along (e.g., surrounds or encircles) at least a portion of the outer surface of the middle plug segment 204. In the example of FIG. 2, a diameter of the upper plug cavity 212 is substantially equivalent (e.g., identical, within one percent, between about one percent and five percent, etc.) of a diameter of the lower plug cavity 214. As such, the example middle plug segment 204 has a constant (e.g., a non-varying) outer diameter. In another example, a diameter of the upper plug cavity 212 may be greater than (e.g., more than one percent greater than) a diameter of the lower plug cavity 214. In some examples, a diameter of the upper plug cavity 212 may be less than (e.g., more than one percent less than) a diameter of the lower plug cavity 214. In some examples, the outer diameter of the middle plug segment 204 can be non-uniform (e.g., stepped, tapered, etc.) to conform to diameters of the upper plug cavity 212 and the lower plug cavity 214.

In the example valve plug 102 of FIG. 2, when the upper plug segment 202, the middle plug segment 204, and the lower plug segment 206 are assembled, the apertures 202a, 204a, 206a align (e.g., coaxially align) to define a valve stem opening 209 (e.g., a central opening) to receive the valve stem 116. Additionally, the upper balancing openings 226 of the upper plug segment 202, the middle balancing openings 228 of the middle plug segment 204, and the lower balancing openings 230 of the lower plug segment 206 align (e.g., coaxially align) to define the pressure balancing passageways 122.

The valve stem 116 of the illustrated example includes a shoulder 218 to engage a notched portion 220 of the upper plug segment 202. To define the notched portion 220, the opening 202a of the upper plug segment 202 is a stepped opening (e.g., a through hole coaxially aligned with a counter bore). The shoulder 218 limits an axial position of the upper plug segment 202 such that the notched portion 220 cannot move past the position of the shoulder 218.

A second or lower end 222 of the valve stem 116 opposite a first end (e.g., opposite the shoulder 218) is externally threaded. An example retaining nut 224 is threaded onto the lower end 222 of the valve stem 116 to couple the valve stem 116 and the valve plug 102. For example, the example retaining nut 224, when coupled to the valve stem 116, provides a clamping force (e.g., in a direction of the longitudinal axis 207) to maintain or fix an axial position of the upper plug segment 202, the middle plug segment 204, and/or the lower plug segment 206 between the retaining nut 224 and the shoulder 218 of the valve stem 116. In some examples, the retaining nut 224 is an internally threaded machine nut or locknut. The example valve plug 102 of FIG. 2 includes a pin 232. The example pin 232 is disposed through an opening 234 in the retaining nut 224 and further through an opening 236 in the valve stem 116. In the example of FIG. 2, the opening 236 in the valve stem 116 is internally threaded and at least a portion of the pin 232 is externally threaded. The example pin 232 maintains and/or fixes an axial position of the retaining nut 224 along the valve stem 116. In other words, the example pin 232 prevents loosening of the retaining nut 224 along the threaded portion of the lower end 222 of the valve stem 116. In some examples, the pin 232 is an externally threaded set screw, the opening 234 in the retaining nut 224 is internally threaded, and the valve stem 116 does not include the opening 236.

In the illustrated example, the upper plug segment 202, the middle plug segment 204, and the lower plug segment 206 are axially fixed along the valve stem 116 without the use of permanent or semi-permanent joining (e.g., welding) between any of the upper plug segment 202, the middle plug segment 204, the lower plug segment 206, and/or the valve stem 116. As such, each of the components (e.g., the upper plug segment 202, the middle plug segment 204, the lower plug segment 206, etc.) can be interchanges and/or selected based on one or more desired dimensional and/or functional properties of the component(s).

For example, the valve plug 102 of the illustrated example has an overall height or length 238 between the first end 102a of the valve plug 102 and the second end 102b of the valve plug 102 (e.g., corresponding to a distance between the first end 102a and the second end 102b). The overall length 238 of the illustrated example is defined by a length 240 of the body 227 of the middle plug segment 204, a length 242 of the body 213 of the upper plug segment 202, and a length 244 of the body 229 of the lower plug segment 206. The middle plug segment 204 can be selected from an assortment of middle plug segments to provide the overall length 238 of the valve plug 102. Additionally or alternatively, the upper plug segment 202 and/or the lower plug segment 206 can be selected from an assortment of upper plug segments and/or lower plug segments to provide the overall length 238 of the valve plug 102. In other words, the length 240 of the middle plug segment 204, the length 242 of the upper plug segment 202, and the length 244 of the lower plug segment 206 determine the overall length 238 of the valve plug 102 (e.g., a length in a longitudinal direction, a stack-up height, etc.).

In some examples, to vary the overall length 238 of the valve plug 102, the middle plug segment 204 can be substituted or replaced with a middle plug segment having a length that is different than the length 240 of the middle plug segment 204 (e.g., a middle plug segment having a greater length, a middle plug segment having a shorter length). Additionally or alternatively, in some examples, to vary the overall length 238 of the valve plug 102, the upper plug segment 202 and/or the lower plug segment 206 can be substituted or replaced with an upper plug segment having a length different than the length 242 of the upper plug segment 202 and/or a lower plug segment having a length different than the length 244 of the lower plug segment 206.

The valve plug 102 of the illustrated example has an overall outer diameter 246. In this example, the overall outer diameter 246 corresponds to an inner diameter of a cage (e.g., the cage 110 of FIG. 1). Specifically, an outer diameter of the upper plug segment 202 and/or an outer diameter of the lower plug segment 206 define the overall outer diameter 246 of the valve plug. To adjust the overall outer diameter 246, the upper plug segment 202 and/or the lower plug segment 206 can be substituted with respective different upper and/or lower plug segments having different diameters. For example, when assembling the valve plug 102, the upper plug segment 202 can be selected from a variety of pre-fabricated upper plug segments such that an outer diameter of the upper plug segment 202 corresponds to the overall outer diameter 246 of the valve plug 102. Similarly, when assembling the valve plug 102, the lower plug segment 206 can be selected from a variety of pre-fabricated lower plug segments such that an outer diameter of the lower plug segment 206 corresponds to the desired overall outer diameter 246 of the valve plug 102. Additionally, the variety of pre-fabricated upper plug segments, middle plug segments, and lower plug segments can include the pressure-balancing openings 226, 228, 230 or can be formed without the pressure-balancing openings 226, 228, 230.

The example upper plug segment 202, the example middle plug segment 204, and/or the example lower plug segment 206 can be fabricated from one or more materials (e.g., metallic, polymeric, composite, etc.). In some examples, each of the upper plug segment 202, the middle plug segment 204, and the lower plug segment 206 are formed from the same material. In some examples, the middle plug segment 204 can be formed from a different material compared to the materials of the upper and lower plug segments 202, 206. For example, the middle plug segment 204 can be formed from a material having a thermal expansion coefficient that is greater than a thermal expansion coefficient of a material of the upper plug segment 202 and/or the lower plug segment 206. In this example, the middle plug segment 204 can function as or provide a thermal wedge between the upper plug segment 202 and the lower plug segment 206. For example, upon heating of the valve plug 102 (e.g., during operation of the control valve 100), the middle plug segment 204 expands at a greater rate than the upper plug segment 202 and/or the lower plug segment 206. As a result, the middle plug segment 204 is compressed into the upper plug cavity 212 and/or the lower plug cavity 214, thus acting as a thermal wedge (e.g., increasing a frictional force or frictional connection between the upper and lower plug segments).

The upper plug segment 202 of the illustrated example can be formed from stock cylindrical material (e.g., bar stock, solid casting, etc.) cut to a desired length. In some examples, the stock cylindrical material can include the upper balancing openings 226 and/or the opening 202a. In other examples, the upper balancing openings 226 and/or the opening 202a can be formed after the stock cylindrical material is cut to the desired length. The middle plug segment 204 of the illustrated example can be formed from stock cylindrical material (e.g., bar stock, solid casting, etc.) cut to a desired length. In some examples, the stock cylindrical material can include the middle balancing openings 228 and/or the opening 204a. In other examples, the middle balancing openings 228 and/or the opening 204a can be formed after the stock cylindrical material is cut to the desired length. The lower plug segment 206 of the illustrated example can also be formed from stock cylindrical material (e.g., bar stock, solid casting, etc.) cut to a desired length. In some examples, the stock cylindrical material can include the lower balancing openings 230 and/or the opening 206a. In other examples, the lower balancing openings 230 and/or the opening 206a can be formed after the stock cylindrical material is cut to the desired length.

Figure 3:
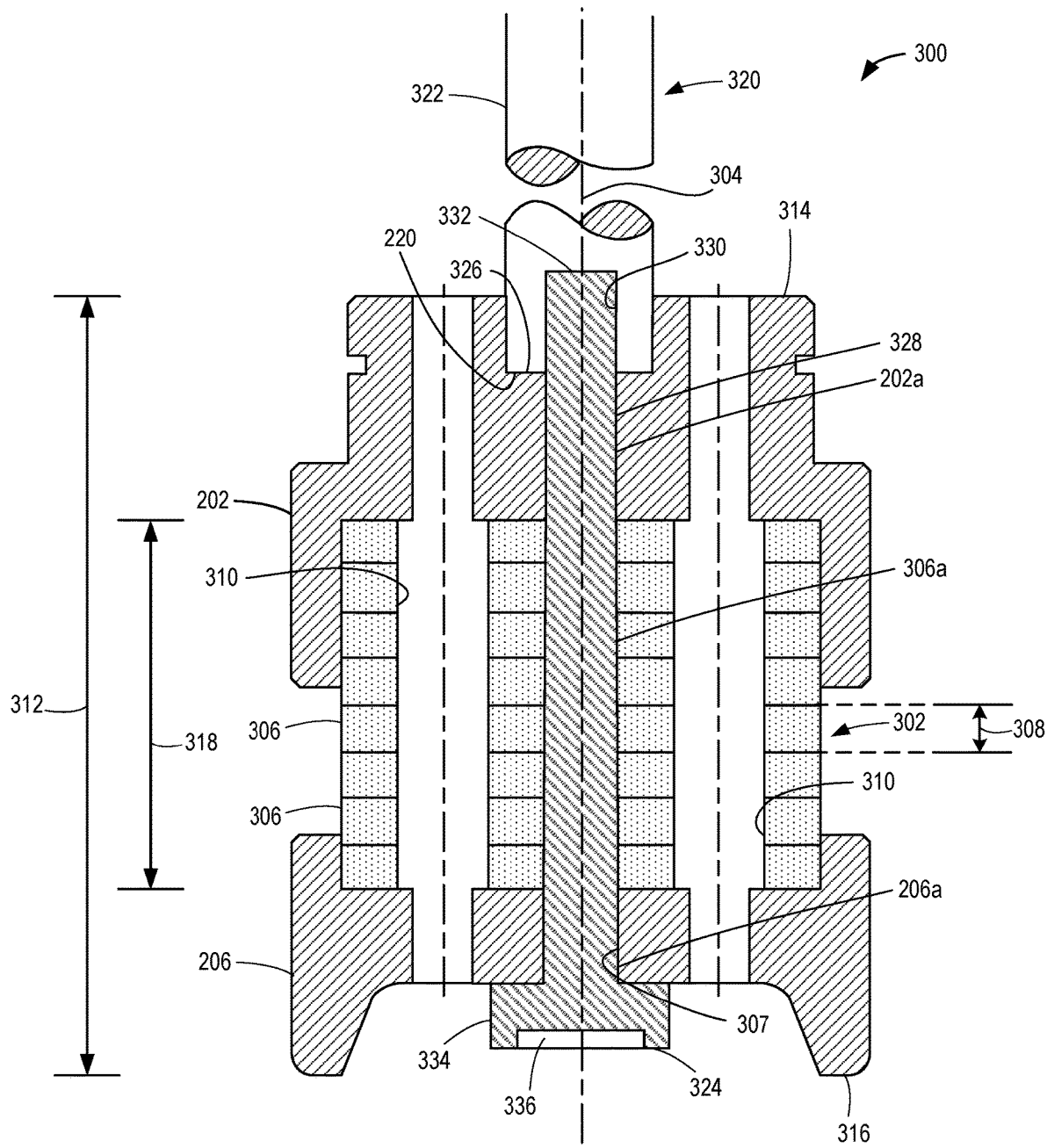
FIG. 3 is a cross-sectional view of another example valve plug disclosed herein.

FIG. 3 is a cross-sectional view of another example valve plug 300 disclosed herein. The example valve plug 300 includes an upper plug segment 202, a middle plug segment 302, and a lower plug segment 206. In the example of FIG. 3, the example valve plug 300 has a cylindrical shape (e.g., a circular cross-section in a plane perpendicular to a longitudinal axis 304 of the valve plug 300). In other examples, the valve plug 300 can have another shape such that the cross-section in the plane perpendicular to the longitudinal axis 304 valve plug 300 is a square, a hexagon, or any other shape.

The example middle plug segment 302 includes a plurality of middle plug disks 306. In the illustrated example, each of the plurality of middle plug disks 306 has a height or length 308. In the illustrated example, the length 308 of each middle plug disk 306 is uniform or the same. However, in some examples, one or more of the middle plug disks 306 can have different lengths. Additionally, each of the example middle plug disks 306 includes a central aperture 306a (e.g., through hole) and balancing openings 310. Each of the central apertures 306a is coaxially aligned with the longitudinal axis 304 of the valve plug 300. The balancing openings 310 of the illustrated example are formed in each of the middle plug disks 306 and are radially spaced relative to the longitudinal axis 304 of the valve plug 300. In the illustrated example, each of the middle plug disks 306 includes two balancing openings. However, in some examples, some or all of the middle plug disks 306 include one balancing opening or more than two balancing openings (e.g., three, four, etc.). In some examples, one or more of the middle plug disks 306 does not include a balancing opening. When assembled, the example middle plug disks 306 are stacked axially to form the middle plug segment 302. Additionally, the apertures 306a and the balancing openings 310 of each of the middle plug disks 306 align (e.g., coaxially align) in the longitudinal direction.

The example valve plug 300 of the illustrated example has an overall length 312 between a first end 314 of the valve plug 300 and a second end 316 of the valve plug 300 (e.g., corresponding to a distance between the first end 314 and the second end 316). The example middle plug segment 302 has a length 318. The overall length 312 is defined by the length 318 of the middle plug segment 302, the length of the upper plug segment 202 above the middle plug segment 302, and the length of the lower plug segment 206 below the middle plug segment 302. The modular design of the middle plug segment 302 allows for ease in selecting and/or modifying the overall length 312 of the example valve plug 300 and, thus, the overall length 312 of the valve plug 300. In the example of FIG. 3, the middle plug segment 302 includes eight middle plug disks 306. Thus, the summation of the length 308 of each middle plug disk 306 provides the length 318 of the middle plug segment 302. The length of the example plug 300 can be modified by adding or removing one or more of the middle plug disks 306 (e.g., in increments associated with the length 308). In some examples, each of the middle plug disks 306 can have a different length value. In some examples, one or more of the middle plug disks 306 can have a different length compared to the height 308.

In the example valve plug 300 of FIG. 3, when assembled, the apertures 202a, 306a, 206a of the respective upper, middle, and lower segments 202, 302, 206 align (e.g., coaxially align) to define a central opening 307 to receive a valve stem 320. The valve stem 320 of the illustrated example includes a stem shaft 322 and a stem bolt 324. The example stem shaft 322 extends axially from the example valve plug 300 to couple the valve plug 300 to an actuator (not shown). A lower end 326 of the stem shaft 322 has a diameter larger than a diameter of a shaft portion 328 of the stem bolt 324. Thus, the lower end 326 of the stem shaft 322 forms a shoulder to engage the notched portion 220 of the upper plug segment 202. The shoulder formed by the lower end 326 of the stem shaft 322 limits an axial position of the upper plug segment 202 such that the notched portion 220 cannot move past a position of the lower end 326 of the stem shaft 322.

The lower end 326 of the stem shaft 322 includes an internally threaded cavity 330 to receive an upper end 332 of the stem bolt 324. The upper end 332 of the stem bolt 324 is externally threaded and disposed at least partially within the cavity 330. In some examples, an entirety of the example shaft portion 328 of the stem bolt 324 is externally threaded. The example shaft portion 328 of the stem bolt 324 extends axially through (e.g., the apertures 202a, 306a, 206a of the lower plug segment 206, the middle plug segment 302, and the upper plug section 202) the upper, middle, and lower plug segments 202, 302, 206. During assembly of the example valve plug 300, the stem bolt 324 can be threaded into the cavity 330 of the stem shaft 322. In the example of FIG. 3, the stem bolt 324 includes a bolt head 334 having a diameter larger than the diameter of the shaft portion 328 of the stem bolt 324. The example bolt head 334 includes an opening 336 to receive a tool for rotating the stem bolt 324 about the longitudinal axis 304. In the example of FIG. 3, the opening 336 is hexagonal. In other examples, the opening 336 can be another shape (e.g., square, star shaped, t-shaped, etc.). The example stem bolt 324, when coupled to the stem shaft 322, provides a clamping force (e.g., in a longitudinal direction) to maintain or fix an axial position of the upper plug segment 202, the middle plug segment 302, and the lower plug segment 206 between the bolt head 334 and the lower end 326 of the stem shaft 322.

In the illustrated example, the upper plug segment 202, the middle plug segment 302, and the lower plug segment 206 are axially fixed along the valve stem 320 without the use of permanent or semi-permanent joining (e.g., welding) between any of the upper plug segment 202, the middle plug segment 302, the lower plug segment 206, and/or the valve stem 320. As such, each of the components (e.g., the upper plug segment 202, the middle plug segment 302, the lower plug segment 206, etc.) can be selected based on one or more desired dimensional and/or functional properties of the component(s).

As discussed above, to vary the overall length 312 of the valve plug 300, a number of middle plug disks 306 of the middle plug segment 302 can be varied (e.g., increased or decreased). For example, to reduce the overall length 312 of the valve plug 300, one or more middle plug disks 306 can be removed. To increase the overall length, one or more middle plug disks 306 can be added. Additionally or alternatively, to vary the overall length 312 of the valve plug 300, the upper plug segment 202 can be substituted or replaced with a different upper plug segment having a length different than the length of the upper plug segment 202 and/or the lower plug segment 206 can be substituted or replaced with a different lower plug segment having a length different than the height of the lower plug segment 206. Further, the stem bolt 324 can be substituted with a stem bolt corresponding to the overall length 312 of the valve plug 300.

Figure 4:
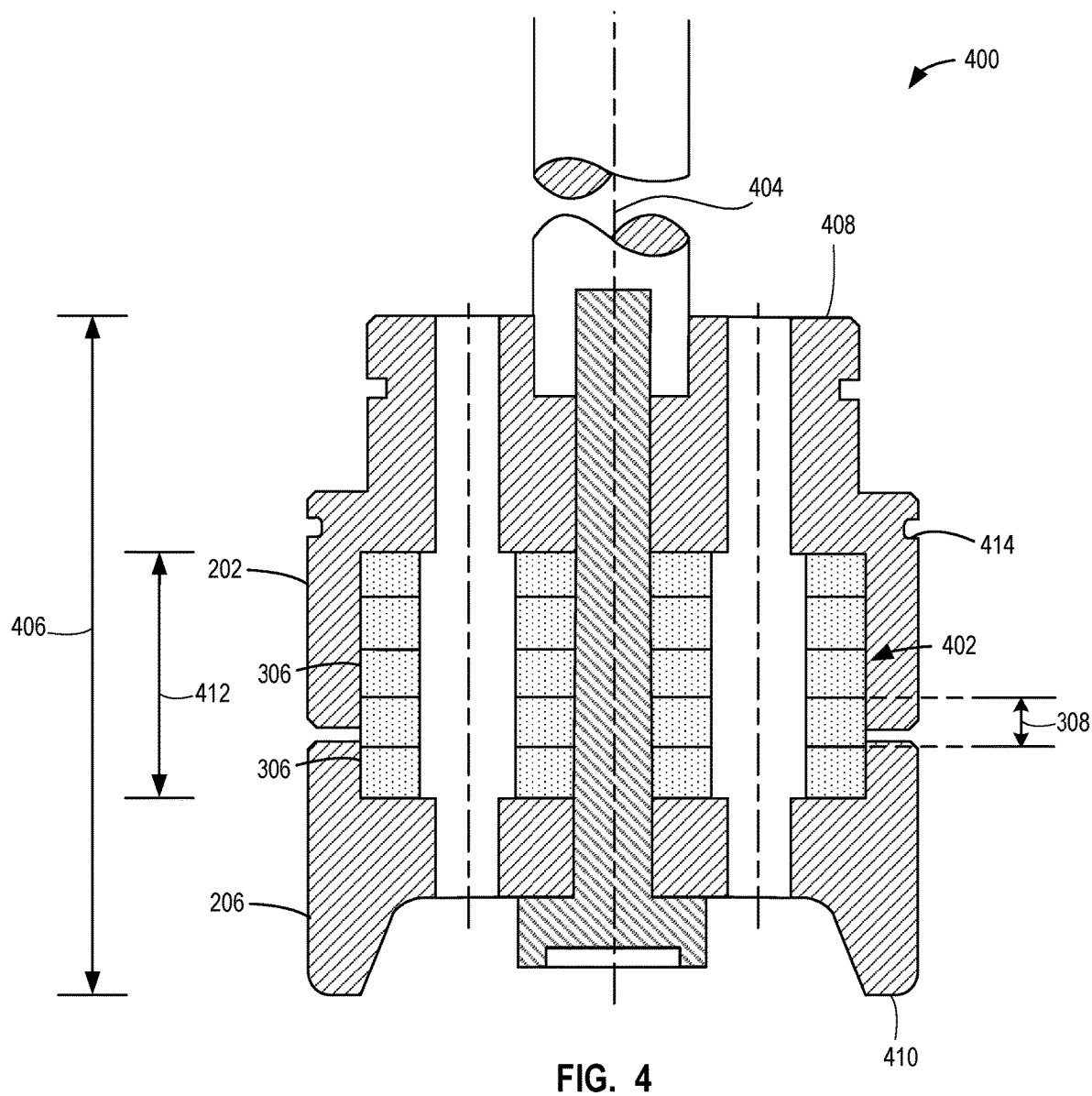
FIG. 4 is a cross-sectional view of yet another example valve plug disclosed herein.

FIG. 4 is a cross-sectional view of another example valve plug 400 disclosed herein. The example valve plug 400 includes the upper plug segment 202, a middle plug segment 402, and the lower plug segment 206. In the example of FIG. 4, the example valve plug 400 has a cylindrical shape (e.g., with a circular cross-section in a plane perpendicular to a longitudinal axis 404 of the valve plug 400) with the cross-section shown in FIG. 4. In other examples, the valve plug 400 can have another shape such that the cross-section in the plane perpendicular to the longitudinal axis 404 valve plug 400 is a square, a hexagon, or any other shape.

The valve plug 400 of the illustrated example is similar to the valve plug 300 of FIG. 3, but has a different overall length 406 between a first end 408 of the valve plug 400 and a second end 410 of the valve plug 400 (e.g., corresponding to a distance between the first end 408 and the second end 410). For example, the example middle plug segment 402 includes a plurality of the middle plug disks 306 each having the length 308 that define an overall length 406. In the illustrated example, the example middle plug segment 402 has a length 412. The overall length 406 is defined by the length 412 of the middle plug segment 402, the length of the upper plug segment 202 (e.g., the length 242 of FIG. 2), and the length of the lower plug segment 206 (e.g., the length 244 of FIG. 2). The length 412 of the middle plug segment 402 is less than the length 318 of the middle plug segment 302 of FIG. 3. As a result, the overall length 406 is less than the overall length 312 of FIG. 3. The modular design of the middle plug segment 402 allows for ease in selecting and/or modifying the overall length 406 of the example valve plug 400. For example, the overall length 412 is reduced by reducing the number of middle plug disks 306 of the middle plug segment 402. For example, in the example of FIG. 4, the middle plug segment 402 includes five middle plug disks 306. In comparison, the valve plug 300 of FIG. 3 has eight middle plug disks 306 to provide the overall length 312. Thus, the length of the example plug 400 can be modified by adding or removing one or more of the middle plug disks 306.

The upper plug segment 202 of the illustrated example includes a cavity 414. The cavity 414 allows for coupling of a seal (e.g., an o-ring) to the upper plug segment 202. The seal can prevent or reduce fluid leakage between an outer surface of the valve plug 400 and an inner surface of a cage (e.g., the example cage 110 of FIG. 1) during operation of a control valve and/or when the valve is in a closed position.

Figure 5:
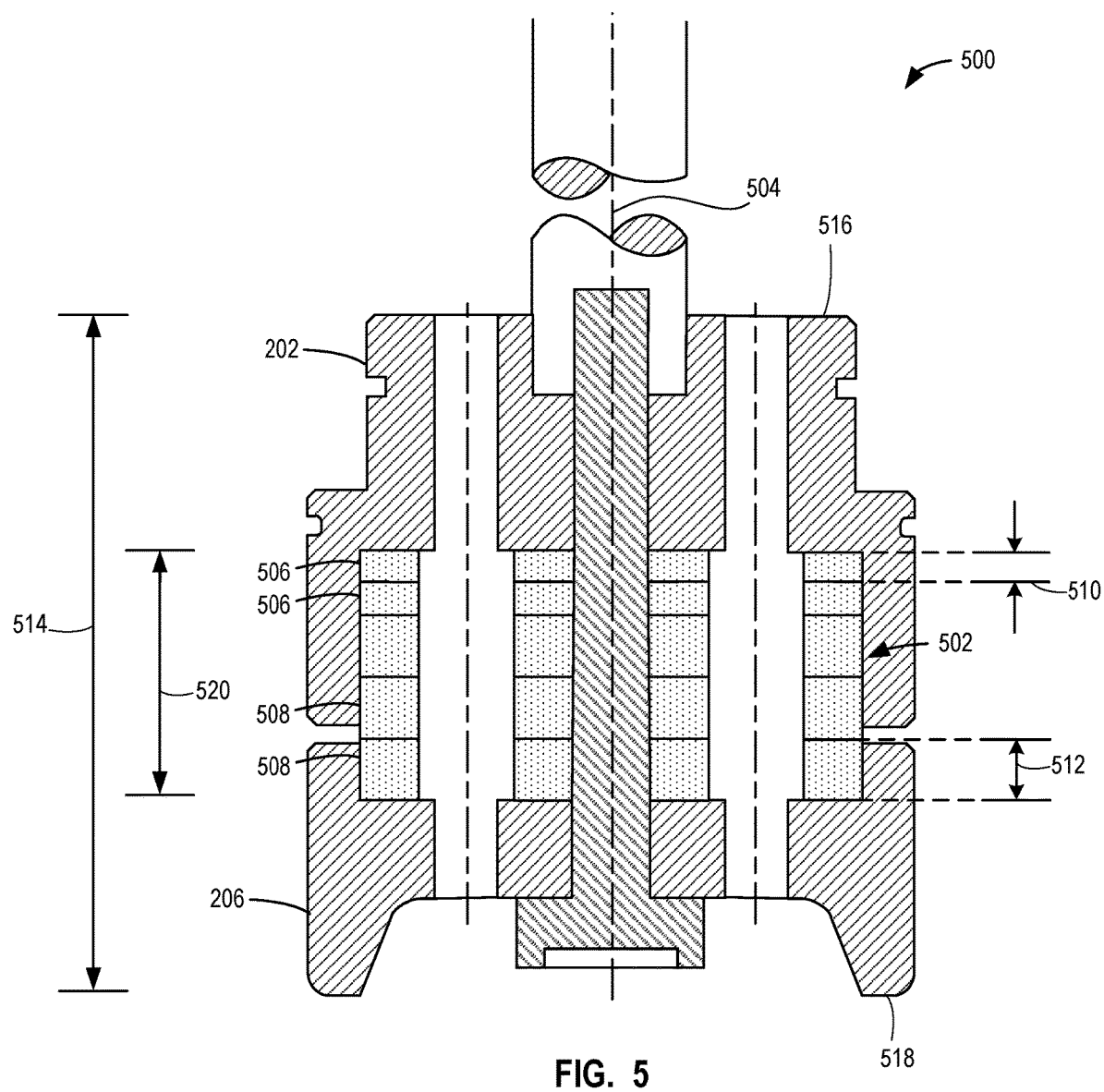
FIG. 5 is a cross-sectional view of another example valve plug disclosed herein.

FIG. 5 is a cross-sectional view of another example valve plug 500 disclosed herein. The example valve plug 500 includes the upper plug segment 202, a middle plug segment 502, and the lower plug segment 206. In the example of FIG. 5, the example valve plug 500 has a cylindrical shape (e.g., with a circular cross-section in a plane perpendicular to a longitudinal axis 504 of the valve plug 500) with the cross-section shown in FIG. 5. In other examples, the valve plug 500 can have another shape such that the cross-section in the plane perpendicular to the longitudinal axis 504 valve plug 500 is a square, a hexagon, or any other shape.

The example middle plug segment 402 includes first middle plug disks 506 and second middle plug disks 508. The example first middle plug disks 506 each have a first length 510 and the second example middle plug disks 508 each have a second length 512 different than the first length 510. For example, the first length 510 of the illustrated example is less than the second length 512. The example first middle plug disks 506 and second middle plug disks 508 are stacked axially to form the middle plug segment 502. The example valve plug 500 of the illustrated example has an overall length 514 between a first end 516 of the valve plug 500 and a second end 518 of the valve plug 500 (e.g., corresponding to a distance between the first end 516 and the second end 518). The example middle plug segment 502 has a length 520. The overall length 514 is defined by the length 520 of the middle plug segment 502, the length of the upper plug segment 202 (e.g., the length 242 of FIG. 2), and the length of the lower plug segment 206 (e.g., the length 244 of FIG. 2). The modular design of the middle plug segment 502 allows for ease in selecting and/or modifying the overall length 514 of the example plug 500. For example, in the example of FIG. 5, the middle plug segment 502 includes two first middle plug disks 506 and three second middle plug disks 508. The overall length 514 of the example plug 500 can be modified by adding or removing one or more of the first middle plug disks 506 and/or the second middle plug disks 508. Because not all of the middle plug disks have the same length, the length 520 of the middle plug segment 502 and, therefore, the overall length 514 of the valve plug 500 can be fine-tuned. In other words, the overall length 514 can be modified based on increments of the length 510 and/or the length 512.

Figure 6:
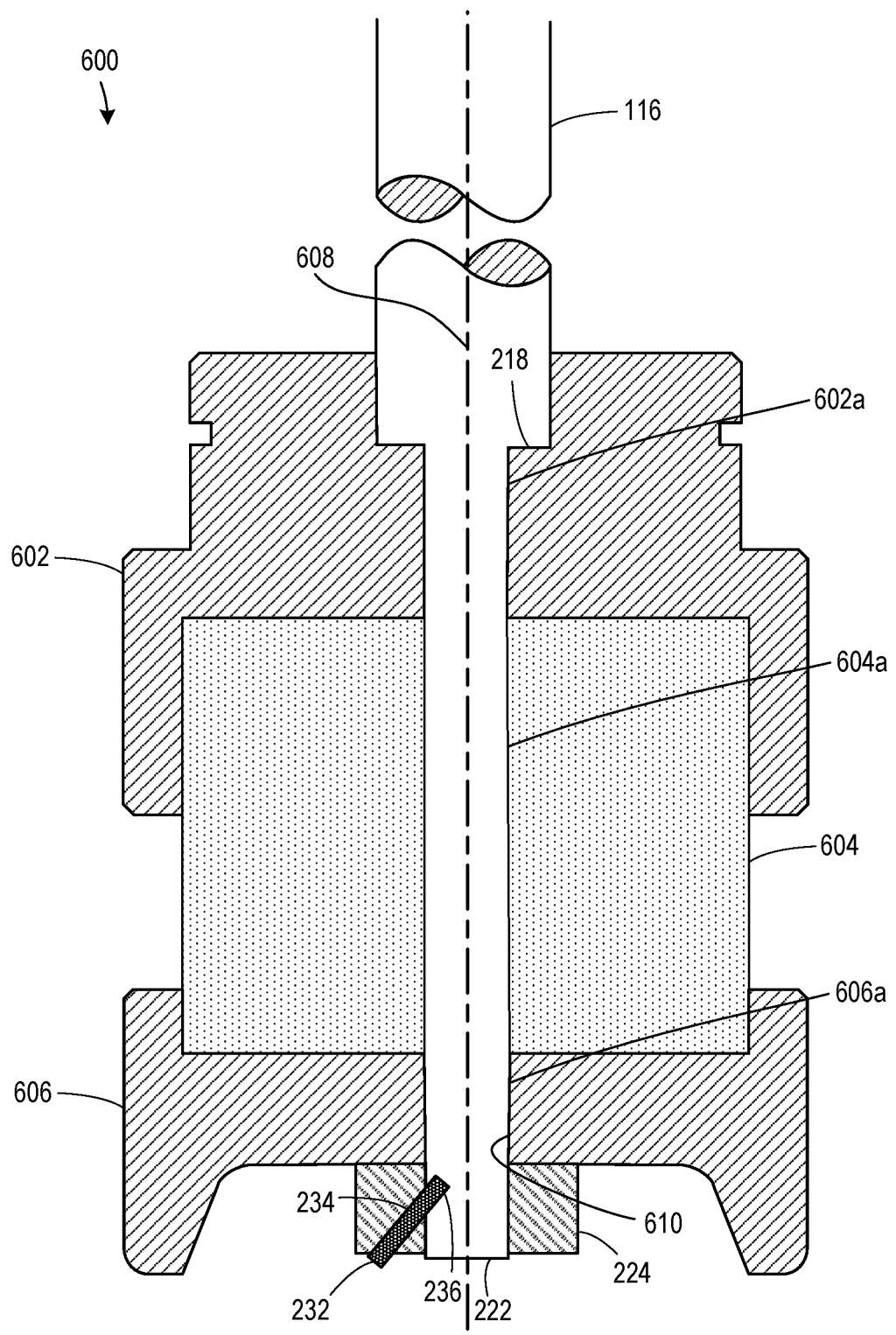
FIG. 6 is a cross-sectional view of yet another example valve plug disclosed herein.

FIG. 6 is a cross-sectional view of another example valve plug 600 disclosed herein. The valve plug 600 of the illustrated example of FIG. 6 includes a first or upper plug segment 602, a second or middle plug segment 604, and a third or lower plug segment 606. In the example of FIG. 6, the example valve plug 600 has a cylindrical shape (e.g., with a circular cross-section in a plane perpendicular to a longitudinal axis 608 of the valve plug 600) with the cross-section shown in FIG. 6. In other examples, the valve plug 600 can have another shape such that the cross-section in the plane perpendicular to the longitudinal axis 608 of the valve plug 600 is a square, a hexagon, or any other shape. The upper plug segment 602, the middle plug segment 604, and the lower plug segment 606 include respective openings 602a, 604a, and 606a that align to define a valve stem opening 610 to receive the valve stem 116.

As described in connection with FIG. 2, the second end 222 of the valve stem 116 opposite the first end (e.g., opposite the shoulder 218) is externally threaded. The example retaining nut 224 is threaded onto the lower end 222 of the valve stem 116 to couple the valve stem 116 and the valve plug 600. For example, the example retaining nut 224, when coupled to the valve stem 116, provides a clamping force (e.g., in a direction of the longitudinal axis 207) to maintain or fix an axial position of the upper plug segment 602, the middle plug segment 604, and/or the lower plug segment 606 between the retaining nut 224 and the shoulder 218 of the valve stem 116. The example valve plug 600 of FIG. 6 includes a pin 232. The example pin 232 is disposed through the opening 234 in the retaining nut 224 and further through the opening 236 in the valve stem 116. In the example of FIG. 6, the opening 236 in the valve stem 116 is internally threaded and at least a portion of the pin 232 is externally threaded. The example pin 232 maintains and/or fixes an axial position of the retaining nut 224 along the valve stem 116.

In the example of FIG. 6, the upper plug segment 602, the middle plug segment 604, and the lower plug segment 606 do not include pressure-balancing openings. Thus, the valve plug 600 is a non-pressure balanced valve plug. In some examples, one or more of the upper plug segment 202, the middle plug segment 204 and/or the lower plug segment 206 of the example valve plug 102 may replace a corresponding segment in the example valve plug 600. For example, the middle plug segment 604 can be used with the upper plug segment 202 and/or the lower plug segment 206 of FIG. 2 and the middle plug segment 604 can provide non-pressure balance functionality. As described in connection with FIG. 2, the example plug 600 of FIG. 6 includes a modular design. As such, each of the components (e.g., the upper plug segment 604, the middle plug segment 604, the lower plug segment 606, etc.) can be selected to match one or more desired properties of the component.

Figure 7:
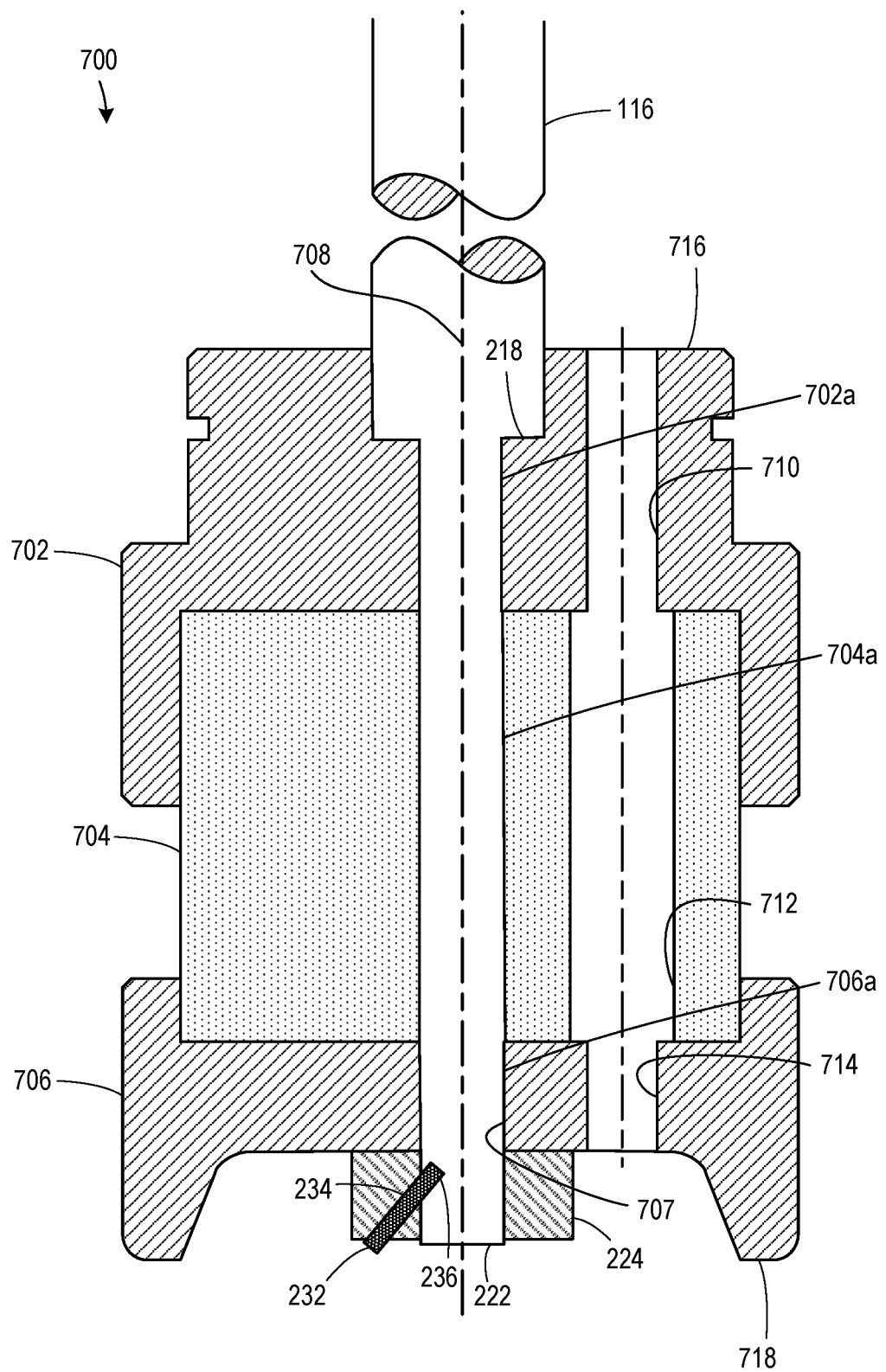
FIG. 7 is a cross-sectional view of another example valve plug disclosed herein.

FIG. 7 is a cross-sectional view of another example valve plug 700 disclosed herein. The valve plug 700 of the illustrated example of FIG. 7 includes a first or upper plug segment 702, a second or middle plug segment 704, and a third or lower plug segment 706. In the example of FIG. 7, the example valve plug 700 has a cylindrical shape (e.g., with a circular cross-section in a plane perpendicular to a longitudinal axis 708 of the valve plug 700) with the cross-section shown in FIG. 7. In other examples, the valve plug 700 can have another shape such that the cross-section in the plane perpendicular to the longitudinal axis 708 of the valve plug 700 is a square, a hexagon, or any other shape. The upper plug segment 702, the middle plug segment 704, and the lower plug segment 706 include respective openings 702a, 704a, and 706a that align to define a valve stem opening 707 to receive the valve stem 116.

As described in connection with FIG. 2, the second end 222 of the valve stem 116 opposite the first end (e.g., opposite the shoulder 218) is externally threaded. The example retaining nut 224 is threaded onto the lower end 222 of the valve stem 116 to couple the valve stem 116 and the valve plug 700. For example, the example retaining nut 224, when coupled to the valve stem 116, provides a clamping force (e.g., in a direction of the longitudinal axis 207) to maintain or fix an axial position of the upper plug segment 702, the middle plug segment 704, and/or the lower plug segment 706 between the retaining nut 224 and the shoulder 218 of the valve stem 116. The example valve plug 700 of FIG. 7 includes a pin 232. The example pin 232 is disposed through the opening 234 in the retaining nut 224 and further through the opening 236 in the valve stem 116. In the example of FIG. 7, the opening 236 in the valve stem 116 is internally threaded and at least a portion of the pin 232 is externally threaded. The example pin 232 maintains and/or fixes an axial position of the retaining nut 224 along the valve stem 116.

In the example of FIG. 7, the upper plug segment 702, the middle plug segment 704, and the lower plug segment 706 include a single pressure-balancing opening. For example, the upper plug segment 702 includes upper balancing openings 710 on a first radial portion of the upper plug segment 702. A second radial portion of the upper plug segment 702 does not include balancing openings. Similarly, the middle plug segment 704 includes middle balancing openings 712 on a first radial portion of the middle plug segment 704 while a second radial portion of the middle plug segment 704 does not include balancing openings. Additionally, the lower plug segment 706 includes lower balancing openings 714 of a first radial portion of the lower plug segment 706 while a second radial portion of the lower plug segment 706 does not include balancing openings. In the example of FIG. 7, the upper balancing openings 710, the middle balancing openings 712, and the lower balancing openings 714 align (e.g., coaxially align) so as to allow fluid communication between a first end 716 of the plug 700 and a second end 718 of the plug 700.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

The foregoing example valve plugs 102, 300, 400, 500, 600, 700 and/or other components disclosed herein can be employed with any control valve. Although each example of the valve plugs 102, 300, 400, 500, 600, 700 and/or other components disclosed above are depicted having certain features, it should be understood that it is not necessary for a particular feature of one example to be used exclusively with that example. Instead, any of the features described above and/or depicted in the drawings can be combined with any of the examples, in addition to or in substitution for any of the other features of those examples. Features of one example are not mutually exclusive to features of another example. Instead, the scope of this disclosure encompasses any combination of any of the features.

At least the upper plug segment 202, 602, 702 can implement first means for forming a valve plug. At least the lower plug segment 206, 606, 706 can implement second means for forming a valve plug. At least the middle plug segment 204, 302, 402, 502, 604, 704 can implement third means for forming a valve plug. At least the upper plug segment 202, 602, 702, the middle plug segment 204, 302, 402, 502, 604, 704, the lower plug segment 206, 606, 706, and/or the middle plug disks 306, 506, 508 can implement means for stacking.

Example methods, apparatus, systems, and articles of manufacture to implement valve plug apparatus for use with control valves are disclosed herein. Further examples and combinations thereof include the following:

Example 1 includes a valve plug apparatus, including an upper plug segment, a middle plug segment, and a lower plug segment, the middle plug segment positioned between the upper plug segment and the lower plug segment, the upper plug segment, the middle plug segment and the lower plug segment defining an overall length of the valve plug, the middle plug segment removably coupled to the upper plug segment and the lower plug segment.

Example 2 includes the valve plug apparatus of example 1, wherein the upper plug segment includes a first cavity and the lower plug segment includes a second cavity, and wherein the middle plug segment has a first end at least partially disposed within the first cavity and a second end opposite the first end at least partially disposed within the second cavity.

Example 3 includes the valve plug apparatus of example 1, wherein the valve plug includes a pressure-balancing opening defined by openings formed in the upper plug segment, the middle plug segment, and the lower plug segment.

Example 4 includes the valve plug apparatus of example 1, wherein the middle plug segment includes a plurality of middle plug disks, the middle plug disks stacked axially to form the middle plug segment.

Example 5 includes the valve plug apparatus of example 1, further including a stem received by a stem opening defined by the upper, middle and lower plug segments.

Example 6 includes the valve plug apparatus of claim 5, wherein the stem includes a shoulder to engage a notched portion of the upper plug segment.

Example 7 includes the valve plug apparatus of example 5, wherein the stem includes a first stem portion including an internally threaded cavity, and a second stem portion including a first end having external threads to engage the internally threaded cavity of the first stem portion.

Example 8 includes the valve plug apparatus of example 5, further including a retaining nut disposed at an end of the stem, the retaining nut to maintain an axial position of the upper plug segment, the middle plug segment, and the lower plug segment relative to the stem.

Example 9 includes the valve plug apparatus of example 8, wherein the retaining nut is internally threaded and the end of the stem is externally threaded.

Example 10 includes the valve plug apparatus of example 8, further including a pin to maintain an axial position of the retaining nut relative to the stem.

Example 11 includes a valve, including a valve body including a fluid inlet, a fluid outlet, and a fluid passageway extending between the fluid inlet and the fluid outlet, and a valve plug apparatus disposed in the fluid passageway, the valve plug apparatus movable relative to the valve body to enable fluid communication between the fluid inlet and the fluid outlet, the valve plug apparatus including a first plug segment, a second plug segment; and a third plug segment, the second plug segment positioned between the first plug segment and the third plug segment, the first plug segment, the second plug segment, and the third plug segment defining an overall length of the valve plug, the second plug segment removably coupled to the first plug segment and the third plug segment.

Example 12 includes the valve of example 11, further including a stem received by a stem opening defined by the first, second and third plug segments.

Example 13 includes the valve of example 11, wherein a diameter of the valve plug apparatus is defined by at least one of a diameter of the first plug segment or the diameter of the third plug segment.

Example 14 includes the valve of example 13, wherein the diameter of the valve plug apparatus corresponds to an inner diameter of a valve cage.

Example 15 includes the valve of example 11, wherein the second plug segment includes a plurality of disks, the disks stacked axially to form the second plug segment.

Example 16 includes the valve of example 15, length one or more of the disks can be removed to reduce an overall height of the valve plug.

Example 17 includes the valve of example 15, wherein a number of the disks included in the plurality of disks can be increased to increase an overall length of the valve plug.

Example 18 includes the valve of example 15, wherein a first portion of the disks has a first length and a second portion of the disks has a second length.

Example 19 includes an apparatus including first means for forming a valve plug, second means for forming a valve plug removably coupled to the first means, and third means for forming a valve plug, the third means removably coupled to the first means and the second means, wherein the first means, the second means, and the third means are stackable to define an overall length of the valve plug.

Example 20 includes the apparatus of example 19, wherein the second means for forming includes a plurality of means for stacking, the means for stacking to be adjusted to vary an overall length.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A valve plug apparatus, comprising:
    an upper plug segment;
    a middle plug segment; and
    a lower plug segment, the middle plug segment positioned between the upper plug segment and the lower plug segment defining a central body of the valve plug apparatus, the upper plug segment, the middle plug segment and the lower plug segment defining an overall length of the valve plug apparatus, the middle plug segment removably coupled to the upper plug segment and the lower plug segment to vary the overall length of the valve plug apparatus.

2. The valve plug apparatus of claim 1, wherein the upper plug segment includes a first body and a first annular wall extending from the first body to define a first cavity and the lower plug segment includes a second body and a second annular wall extending from the second body to define a second cavity, and wherein the middle plug segment has a first end at least partially disposed within the first cavity and a second end opposite the first end at least partially disposed within the second cavity.

3. The valve plug apparatus of claim 1, wherein the middle plug segment includes a plurality of middle plug disks, the middle plug disks stacked axially to form the middle plug segment.

4. The valve plug apparatus of claim 1, further including a stem received by a stem opening defined by the upper, middle and lower plug segments.

5. The valve plug apparatus of claim 4, wherein the stem includes a shoulder to engage a notched portion of the upper plug segment.

6. The valve plug apparatus of claim 4, wherein the stem includes:
    a first stem portion including an internally threaded cavity; and
    a second stem portion including a first end having external threads to engage the internally threaded cavity of the first stem portion.

7. The valve plug apparatus of claim 4, further including a retaining nut disposed at an end of the stem, the retaining nut to maintain an axial position of the upper plug segment, the middle plug segment, and the lower plug segment relative to the stem.

8. The valve plug apparatus of claim 7, wherein the retaining nut is internally threaded and the end of the stem is externally threaded.

9. The valve plug apparatus of claim 7, further including a pin to maintain an axial position of the retaining nut relative to the stem.

10. A valve plug apparatus, comprising:
    an upper plug segment;
    a middle plug segment; and
    a lower plug segment, the middle plug segment positioned between the upper plug segment and the lower plug segment, the upper plug segment, the middle plug segment and the lower plug segment defining an overall length of the valve plug apparatus, the middle plug segment removably coupled to the upper plug segment and the lower plug segment, wherein the valve plug includes a pressure-balancing opening defined by openings formed in the upper plug segment, the middle plug segment, and the lower plug segment.

11. A valve, comprising:
    a valve body including a fluid inlet, a fluid outlet, and a fluid passageway extending between the fluid inlet and the fluid outlet; and
    a valve plug apparatus disposed in the fluid passageway, the valve plug apparatus movable relative to the valve body to enable fluid communication between the fluid inlet and the fluid outlet, the valve plug apparatus including:
        a first plug segment;
        a second plug segment; and
        a third plug segment, the second plug segment positioned between the first plug segment and the third plug segment, the first plug segment, the second plug segment, and the third plug segment defining an overall length of the valve plug, the second plug segment having a first height, the second plug segment removably coupled to the first plug segment and the third plug segment and interchangeable with a fourth plug segment having a second height different than the first height to vary the overall length of the valve plug.

12. The valve of claim 11, further including a stem received by a stem opening defined by the first, second and third plug segments.

13. The valve of claim 11, wherein a diameter of the valve plug apparatus is defined by at least one of a diameter of the first plug segment or the diameter of the third plug segment.

14. The valve of claim 13, wherein the diameter of the valve plug apparatus corresponds to an inner diameter of a valve cage.

15. The valve of claim 11, wherein the second plug segment includes a first plurality of disks stacked axially to form the second plug segment and the fourth plug segment includes a second plurality of disks stacked axially to form the fourth plug segment.

16. The valve of claim 15, wherein one or more of the disks are at least one of removed to reduce the overall length of the valve plug or added to increase the overall length of the valve plug.

17. The valve of claim 15, wherein a first portion of the disks has a first length and a second portion of the disks has a second length.

18. A valve, comprising:
    a valve body including a fluid inlet, a fluid outlet, and a fluid passageway extending between the fluid inlet and the fluid outlet; and
    a valve plug apparatus disposed in the fluid passageway, the valve plug apparatus movable relative to the valve body to enable fluid communication between the fluid inlet and the fluid outlet, the valve plug apparatus including:
    a first plug segment;
    a second plug segment, the second plug segment includes a plurality of disks, the disks stacked axially to form the second plug segment; and
    a third plug segment, the second plug segment positioned between the first plug segment and the third plug segment, the first plug segment, the second plug segment, and the third plug segment defining an overall length of the valve plug, the second plug segment removably coupled to the first plug segment and the third plug segment, wherein a number of the disks included in the plurality of disks to be at least one of added to increase the overall length of the valve plug or removed to reduce the overall length of the valve plug.

19. An apparatus, comprising:
    first means for forming a valve plug;
    second means for forming the valve plug removably coupled to the first means;
    third means for forming the valve plug, the third means removably coupled to the first means and the second means, wherein the first means, the second means, and the third means are stackable to define an overall length of the valve plug; and
    means for providing pressure-balancing formed in the first means, the second means, and the third means for forming the valve plug.

20. The apparatus of claim 19, wherein the second means for forming includes a plurality of means for stacking, the means for stacking to be adjusted to vary the overall length.

* * * * *